United States Patent Office 2,924,599
Patented Feb. 9, 1960

2,924,599

DERIVATIVES OF 1:3:5-TRIAZANAPHTHALENE

Vincent Oakes, Brooklands, Sale, and Henry N. Rydon, Hale, England; said Oakes assignor to The Anchor Chemical Company Limited, Clayton, England, a British company No Drawing. Application July 12, 1957
Serial No. 671,410

Claims priority, application Great Britain July 16, 1956

2 Claims. (Cl. 260—256.4)

This invention has for its object to provide new derivatives of 1:3:5-triazanaphthalene having properties which render them useful for therapeutic purposes or as intermediates for the production of other useful substances. It has for a further object the provision of convenient methods of preparing such compounds.

The new compounds according to the present invention are derivatives of 6-methyl-1:3:5-triazanaphthalene, of the general formula

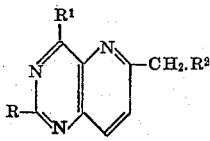

where R and $R^1$ may be hydrogen, halogen, hydroxyl, amino or substituted amino radicals, and $R^2$ is hydrogen, halogen or an amino-acid or other substituted amino residue, particularly a residue of p-aminobenzoic acid or a derivative thereof.

Compounds according to the invention which may be used as intermediates in the preparation of other derivatives of 1:3:5-triazanaphthalene include 2:4-dihydroxy-6-methyl-1:3:5-triazanaphthalene, 2:4-dichloro-6-methyl-1:3:5 - triazanaphthalene, 4 - amino-2-chloro-6-methyl-1:3:5-triazanaphthalene, 2:4-diamino-6-methyl-1:3:5-triazanaphthalene, 2:4-diamino-6-bromomethyl-1:3:5-triazanaphthalene.

A compound according to the invention which has desirable biological activity is N-[2:4-diamino-6-(1:3:5-triazanaphthyl)-methyl]-p-aminobenzoic acid, which has been found to be an active competitive inhibitor of pteroylglutamic acid. Another compound which is believed to have similar activity is N-[2:4-diamino-6-1:3:5 - triazanaphthyl) - methyl] - p - aminobenzamido-glutaric acid.

The invention further comprises certain new compounds, namely 6-methylquinolinic acid, 6-methylquinolinamide, 6-methylquinolinimide, and 3-amino-6-methylpicolinic acid, and their manufacture. These compounds are useful as intermediates in the preparation of derivatives of 6-methyl-1:3:5-triazanaphthalene.

According to the invention, the 1:3:5-triazanaphthalene derivatives can conveniently be prepared from 3-amino-6-methylpicolinic acid, which on fusion with urea gives 2:4 - dihydroxy-6-methyl-1:3:5-triazanaphthalene. This compound is represented by the above formula, when $R=R^1=OH$ and $R^2=H$.

This dihydroxy-compound may be converted into the corresponding 2:4-dichloro-compound, from which by suitable treatment with ammonia the 4-amino-2-chloro-compound or the 2:4-diamino-compound is obtainable.

Side-chain halogenation of 2:4-diamino-6-methyl-1:3:5-triazanaphthalene, followed by condensation with an amino-acid such a p-aminobenzoic acid or a derivative thereof yields N-[2:4-diamino-6-(1:3:5-triazanaphthyl)-methyl]-p-aminobenzoic acid or analogues thereof.

3-amino-6-methylpicolinic acid may be obtained from 8-hydroxy-2-methylquinoline, which is converted by oxidation into 6-methylquinolinic acid, from which an amide is derived by esterification and treatment wtih ammonia. The amide is converted into an imide, from which 3-amino-6-methylpicolinic acid is derived by a Hofmann reaction.

Methods of preparation of compounds according to the invention are illustrated by the following examples.

*Example 1*

8-hydroxy-2-methylquinoline (20 g.) in carbon tetrachloride (50 ml.) was added dropwise with cooling and stirring to fuming nitric acid (100 ml.). After stirring for a further 30 min., the mixture was concentrated to 50 ml. Water (300 ml.) was added and the filtered solution evaporated to dryness; 6-methylquinolinic acid, M.P. 164° C. was extracted from the resulting gum with ethanol. Yield 10 g. 44%.

6-methylquinolinic acid (4 g.) was refluxed on the steam bath for 4 hours with ethanol (10 g.) and sulphuric acid (10 g.). The cooled product was poured into ice, basified with ammonium hydroxide and extracted with ether. The crude ester obtained by evaporating the extract was suspended in ammonium hydroxide solution (e.g. 0.880; 40 ml.) and ammonia passed through the suspension for 5 hours. 6-methylquinolinamide separated (1.8 g.; 46%) and crystallised from water in needles, M.P. 210°.

This amide (20 g.) was heated in an oil-bath at 210–215° until evolution of ammonia ceased. The product was cooled, crushed and recrystallised from ethyl acetate, affording the imide (18 g.; 99.5%) prisms, M.P. 244°.

Aqueous sodium hypobromite (from bromine, 5.6 ml., and ice-cold 2 N-sodium hydroxide, 120 ml.) was added to a solution of 6-methylquinolinimide (16 g.) in ice-cold 2 N-sodium hydroxide (300 ml.) and the mixture kept at room temperature for an hour and then at 80° for a further hour. After cooling, the pH was brought to 5 with 50% sulphuric acid and the mixture kept at 2° for 24 hours. The small amount of precipitate was filtered off and the filtrate treated with copper acetate (6 g.), in hot water (150 ml.) containing acetic acid (6 ml.). The precipitated copper salt was collected by filtration, washed with water and resuspended in water (150 ml.); the suspension was then saturated with hydrogen sulphide. Copper sulphide was removed by filtration and the filtrate decolourised with charcoal and evaporated to dryness. The resulting 3-amino-6-methylpicolinic acid (7.5 g.; 50%) crystallised from ethanol in pale yellow prisms, M.P. 205°.

3-amino-6-methyl-picolinic acid (5 g.) was intimately mixed with urea (3 g.) and the mixture heated slowly to 190–200° and kept at this temperature for an hour. The cooled product was dissolved in 2 N-sodium hydroxide (50 ml.) and decolourised with charcoal. Saturation with carbon dioxide precipitated 2:4-dihydroxy-6-methyl-1:3:5-triazanaphthalene (2.2 g.; 38%) which crystallised from water in small needles, M.P. above 370°.

*Example 2*

2:4 - dichloro - 6 - methyl - 1:3:5 - triazanaphthalene. The dihydroxy-compound, Example 1 (500 mg.), was heated under reflux for 6 hours with phosphorus oxychloride (15 ml.) and triethylamine (1 ml.). The product was evaporated to dryness under reduced pressure and the residue heated at 100°/12 mm. for an hour. The cooled residue was treated with ice-water (15 ml.), and the insoluble portion collected by filtration, dried at the pump and sublimed at 140° (bath)/0.1 mm. The resulting dichloro-compound (300 mg.; 50%), recrystallised from light petroleum (B.P. 80–100°), had M.P. 138°,

Example 3

4 - amino - 2 - chloro - 6 - methyl - 1:3:5 - triazanaphthalene. Ammonia was passed for 15 min. through a solution of the dichloro-compound, Example 2 (190 mg.), in anhydrous dioxan (20 ml.). The product was evaporated to dryness under reduced pressure; treatment of the residue with water (15 ml.) filtration and washing with water afforded the amino-chloro-compound (150 mg.; 87%) which crystallised from benzene in needles, M.P. 261°.

Example 4

2:4-diamino-6-methyl-1:3:5-triazanaphthalene. The dichloro-compound, Example 2 (765 mg.), or the amino-chloro-compound, Example 3 (700 mg.), was heated in a sealed tube at 170° for 16 hours with saturated ethanolic ammonia (15 ml.). The cooled product was filtered and the solid washed with water, dried and recrystallised from benzene-ethanol, affording the diamino (600 mg.; 95%) as needles, M.P. 241°.

Example 5

2:4 - diamino - 6 - methyl - 1:3:5 - triazanaphthalene (500 mg.), sodium acetate (300 mg.) and bromine (0.172 ml.), dissolved in acetic acid (10 ml.), were heated in a sealed tube at 140° until all the bromine had reacted (40 hours). p-Aminobenzoic acid (800 mg.), in acetic acid (15 ml.), was then added and the mixture heated on the steam-bath for 4 hours. The cooled product was filtered and the filtrate evaporated to dryness. After thorough extraction with hot water, the residue was dissolved in aqueous ammonium hydroxides; acidification with acetic acid precipitated N-[2:4-diamino-6-(1:3:5-triazanaphthyl)-methyl]-p-aminobenzoic acid (40 mg.; 5%), as a brown powder, M.P. 245–246°.

The compositions of the new compounds referred to in the above examples were verified by analysis.

What we claim is:

1. N-[2:4-diamino-6-(1:3:5-triazanaphthyl)-methyl]-p-aminobenzoic acid.
2. N-[2:4-diamino-6-(1:3:5-triazanaphthyl)-methyl]-p-aminobenzamido-glutaric acid.

References Cited in the file of this patent

UNITED STATES PATENTS

| | | |
|---|---|---|
| 2,513,099 | Mueller | June 27, 1950 |
| 2,686,781 | Hitchings et al. | Aug. 17, 1954 |

OTHER REFERENCES

McLean et al.: Journal Chemical Society, pp. 2582–2585 (1949).

Chemical Abstracts, vol. 34, p. 4069 (1940).